US007675281B1

(12) United States Patent
Holt et al.

(10) Patent No.: US 7,675,281 B1
(45) Date of Patent: Mar. 9, 2010

(54) TIME-BASED SYNCHRONOUS RECTIFICATION IN A POWER CONVERTER

(75) Inventors: James Holt, Los Altos, CA (US); Jonathan Klein, Palo Alto, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 444 days.

(21) Appl. No.: 11/606,462

(22) Filed: Nov. 30, 2006

(51) Int. Cl.
*G05F 1/00* (2006.01)
(52) U.S. Cl. ........................ 323/288; 323/282
(58) Field of Classification Search ................. 323/282, 323/283, 284, 285, 288
See application file for complete search history.

(56) References Cited

U.S. PATENT DOCUMENTS 5,481,178 A   1/1996   Wilcox et al.

2004/0056644 A1*  3/2004  Wang ............................ 323/288
2007/0247128 A1* 10/2007  Yang ............................ 323/282

* cited by examiner

*Primary Examiner*—Adolf Berhane
*Assistant Examiner*—Matthew Grubb
(74) *Attorney, Agent, or Firm*—Sidley Austin LLP

(57) ABSTRACT

In one embodiment, in a power converter system having first and second switches connected in a half-bridge arrangement at a common node from which current flows through an inductor to a regulated output terminal, wherein the regulated output terminal is connectable to a load, wherein the first and second switches are turned on and off in cycles, a method is provided for synchronous rectification. The method includes: initiating a cycle in which the first switch is turned on; developing a timer based on the on-time of the first switch during the cycle; turning off the first switch and turning on the second switch during the cycle; and outputting a control signal to turn off the second switch when either the timer expires or a new cycle is initiated to turn on the first switch, thereby providing synchronous rectification in the power converter system.

31 Claims, 4 Drawing Sheets

TIME-BASED SYNCHRONOUS RECTIFICATION IN A POWER CONVERTER

BACKGROUND

1. Field of Invention

The present invention relates to power converters, and more particularly, to time-based synchronous rectification in a power converter.

2. Description of Related Art

Power converters are essential for many modern electronic devices. Among other capabilities, power converters can adjust voltage level downward (buck converter) or adjust voltage level upward (boost converter). Power converters may also convert from alternating current (AC) power to direct current (DC) power, or vice versa. Power converters are typically implemented using one or more switching devices, such as transistors, which are turned on and off to deliver power to the output of the converter. Control circuitry is provided to regulate the turning on and off of the switching devices, and thus, these converters are known as "switching voltage regulators" or "switching voltage converters." The power converters may also include one or more capacitors or inductors for alternately storing and outputting energy.

Switching voltage converters can be used in low power applications such as portable electronic devices (e.g., laptop computers, cell phones, etc.), for example, to convert a voltage at a higher level (e.g., 5V) to a voltage at a lower level (e.g., 1V). To maximize efficiency in switching voltage converters, it is desirable to prevent current from reversing in the output inductor. Reverse current flow at light load degrades efficiency by increasing the RMS current that flows through switching elements and the output inductor. This RMS current causes unnecessary losses.

SUMMARY

According to an embodiment of the present invention, in a power converter system having first and second switches connected in a half-bridge arrangement at a common node from which current flows through an inductor to a regulated output terminal, wherein the regulated output terminal is connectable to a load, wherein the first and second switches are turned on and off in cycles, a method is provided for synchronous rectification. The method includes: initiating a cycle in which the first switch is turned on; developing a timer based on the on-time of the first switch during the cycle; turning off the first switch and turning on the second switch during the cycle; and outputting a control signal to turn off the second switch when either the timer expires or a new cycle is initiated to turn on the first switch, thereby providing synchronous rectification in the power converter system.

According to another embodiment of the present invention, in a DC-to-DC power converter system having first and second switches connected in a half-bridge arrangement at a common node from which current flows through an inductor to a regulated output terminal, wherein the regulated output terminal is connectable to an output capacitor and a load, a method is provided for synchronous rectification. The method includes providing a timing clock signal; starting the timing clock signal when the first switch is turned off; and outputting a control signal to turn off the second switch when either the PWM modulator begins a new cycle to turn on the first switch or when the timing clock signal times out.

According to another embodiment of the present invention, a power converter system includes first and second switches connected in a half-bridge arrangement at a common node. The first and second switches are turned on and off in cycles. An inductor is connected between the common node and a regulated output terminal, which is connectable to a load. A predictive timing circuit is operable to start a timing clock signal when the first switch is turned off after one cycle. The predictive timing circuit is operable to output a control signal to turn off the second switch when either another cycle begins or when the timing clock signal times out.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1 through 4B of the drawings. Like numerals are used for like and corresponding parts of the various drawings.

Figure 1:
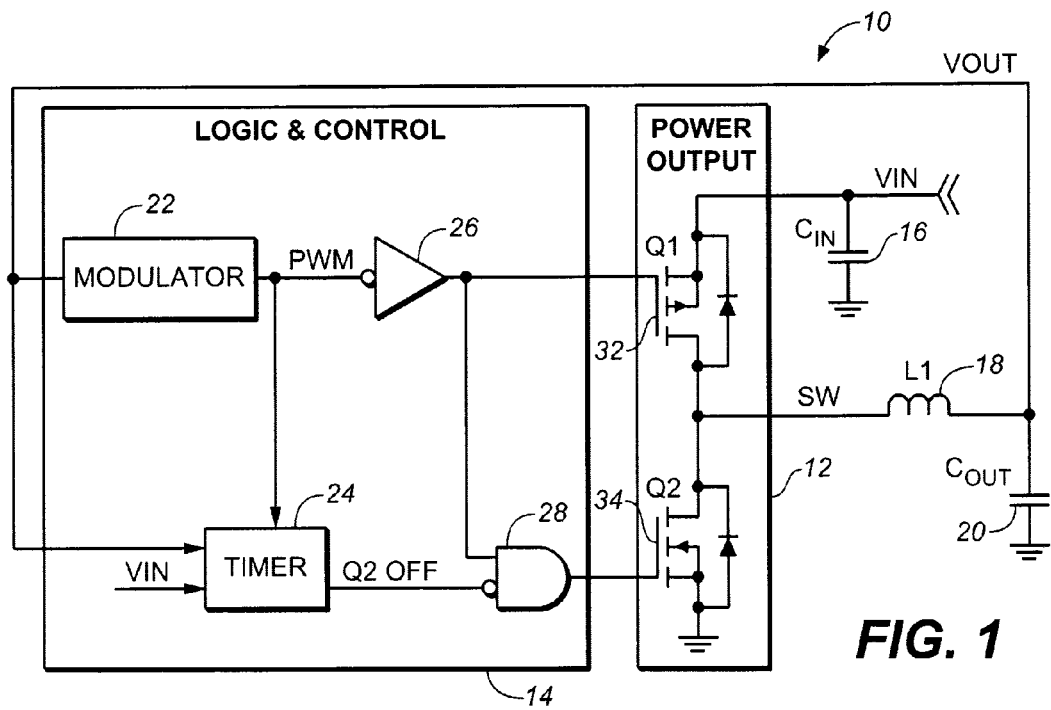
FIG. 1 is a schematic diagram of a power converter system with time-based synchronous rectification, according to an embodiment of the invention.

FIG. 1 is a schematic diagram of an implementation of a power converter system 10 with time-based synchronous rectification, according to an embodiment of the invention. Power converter system 10 is a switching regulator and can provide a direct current (DC) power. Power converter 10 can be incorporated in or used with any electronic device in which a DC-to-DC converter as described herein is needed. Power converter system 10 receives an input voltage VIN and provides the DC power to a load at an output terminal VOUT. In one embodiment, power converter system 10 can be a synchronous buck converter which convert a voltage at a higher level (e.g., 5V) to a voltage at a lower level (e.g., 1V). As shown, power converter system 10 includes a power output circuit 12, a logic and control circuit 14, an input capacitor 16, an inductor 18, and an output capacitor 20.

The inductor 18 is coupled to the output capacitor 20 at the output terminal of the power converter system 10. As used herein, the terms "coupled" or "connected," or any variant thereof, covers any coupling or connection, either direct or indirect, between two or more elements. The power output circuit 12 is coupled to the inductor 18. Power output circuit 12 may comprise one or more switches 32 which are turned on when the PWM signal of logic circuit 14 is high and turned off when the PWM signal is low to ramp up and down the current of inductor 18, thereby providing current to the load connected to VOUT and to charge and discharge output capacitor 20.

In one implementation, as depicted, power output circuit 12 comprises switches 32, 34 (also referred to as Q1, Q2). Switches 32 and 34 are connected at a switching node (SW) in a half-bridge arrangement, with Q1 switch 32 being the "high-side" switch and Q2 switch 34 being the "low-side" switch. As the high-side switch, switch 32 may be connected between the input voltage VIN and node SW. As the low-side switch, switch 34 may be connected between the node SW and ground (GND). Each of switches 32 and 34 can be implemented with any suitable device, such as, for example, a metal-oxide-semiconductor field effect transistor (MOSFET), an IGBT, a MOS-gated thyristor, or other suitable power device. Each switch 32, 34 has a gate to which driving voltage may be applied to turn the switch on or off.

Logic and control circuit 14 is connected to the gates of switches 32 and 34, and outputs control signals for turning on and off the switches 32 and 34. When logic and control circuit 14 turns on high-side switch 32, the power converter system 10 ramps up the inductor current of inductor 18 and charges up output capacitor 20. When logic and control circuit 14 turns on low-side switch 34, the power converter system 10 ramps down the current of inductor 18 and discharges output capacitor 20. The switches 32 and 34 are alternately driven. That is, the high-side switch 32 is not turned on simultaneously with the low-side switch 34. Low-side switch 34 provides synchronous rectification for power converter system 10. For synchronous rectification, switch 34 is turned off during the charge cycle for inductor 18, and turned on during the discharge cycle of inductor 18.

According to previously developed techniques, the synchronous rectifier in a switching voltage converter is controlled by detecting the inductor current and turning off the synchronous rectifier when the inductor current reaches zero. Detecting the inductor current is typically done by sensing the voltage at the SW node when switch Q2 is on. This requires a high-speed, very low offset comparator. The demands on the design of that comparator go up as switching frequency increases, and as the RDS(ON) of switch Q2 is small. In particular, because clock rates have now moved above 10 MHz, the propagation delay of that comparator can create a significant error, reducing efficiency by turning off the synchronous rectifier late.

In various embodiments, the present invention provides a different way to control the synchronous rectifier in a switching regulator. In some embodiments, the invention predicts when the synchronous rectifier (switch 34) should be turned off based on the input voltage VIN, the output voltage VOUT, and the on-time of the high-side switch 32.

Referring again to FIG. 1, logic and control circuit 14 may include a modulator block 22, a timer block 24, a driver block 26, and a AND gate 28. Modulator block 22 receives VOUT as a feedback signal. Modulator block 22 outputs a pulse width modulation (PWM) signal, which is provided to driver block 26. Driver block 26 drives the gate of the high-side switch 32 to turn it on when the PWM signal is high, and off when the PWM signal is low. Implementations for modulator block 22 and driver block 26 are understood to one of ordinary skill in the art. The output signal from driver block 26 is also provided to one input of AND gate 28. The other input of AND gate 28 is coupled to receive an output signal from timer block 24. AND gate 28 provides an output signal for driving the gate of low-side switch 34.

Timer block 24 receives the PWM signal from modulator block 22. Timer block 24 generally functions to provide or support a timer by which synchronous rectification is controlled, at least in part. In particular, with timer block 24, logic and control circuit 14 implements a time-based technique for turning off the synchronous rectifier (low-side switch 34). In its simplest form, a timer is started when the high-side switch 32 turns off (e.g., the PWM signal goes low). Timer block 24 outputs a signal (Q2 OFF) which turns off the synchronous rectifier (low-side switch 34) when the first of the following two events occurs: (1) a new PWM cycle is begun (e.g., the PWM signal goes high), causing high-side switch 32 to turn on; (2) the timer block 24 expires or times out. The power converter system 10 operates in a single mode at all times, with synchronous rectification based on predictive timing, and does not require sensing the current in the inductor 18 or the voltage on the SW node.

In some embodiments, the timer implemented by timer block 24 may be fixed—i.e., it times out after a predetermined period of time.

In other embodiments, the timer can vary, for example, as a function of the time that the high-side switch 32 is turned on during the relevant cycle. Such embodiments take advantage of the fact that the slope of the current through the inductor 18 is a function of VIN and VOUT. The modulator block 22 determines or derives the on time ($T_{ON}$) for the high-side switch 32. The low-side switch 34 (i.e., the synchronous rectifier) turns on when the high side switch 32 turns off, and turns off either when PWM signal goes high or when timer block 24 times out. The time that timer block 24 expires can be set to correspond to the time that it takes to discharge the current that was built up when the high-side switch 32 was on.

In particular, for the latter embodiments, to develop the timing signal, the following relationships are observed.

The duty cycle (D) of a buck converter is based on the ratio of VIN and VOUT:

$$D \cong \frac{VOUT}{VIN} \quad (1)$$

$$T_{ON} = D \cdot T_{SW} = \frac{D}{F_{SW}} \quad (2)$$

$$T_{OFF} = (1-D) \cdot T_{SW} \quad (3)$$

where $F_{SW}$ is the switching frequency and $T_{SW}$ is the switching period. The change inductor current ($\Delta I$) during the $T_{ON}$ is:

$$\Delta I = \frac{V_{L(ON)}}{T_{ON}} \cong \frac{VIN - VOUT}{T_{ON}} \quad (4)$$

The inductor current change ($\Delta I$) during the $T_{OFF}$ is:

$$\Delta I = \frac{V_{L(OFF)}}{T_{OFF}} \cong \frac{VOUT}{T_{OFF}} \quad (5)$$

Thus, in some embodiments, the timer of timer block 24 times out or ends when the volt-seconds of $T_{OFF}$ equals the volt-seconds of the preceding $T_{ON}$. As such, embodiments of the invention may implement a technique to turn off the synchronous rectifier (low-side switch 34) based on a volt-second balance (time) for synchronous buck converters. This may have the effect of causing almost no extra dead-time during steady-state and only small increases in dead-time during transients.

Embodiments of the invention can provide for low-power operation. The embodiments may also make facilitate or allow low power operation of a power converter or regulator at high frequencies.

In various embodiments, all or a portion of power converter system 10 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals there between. In one embodiment, power output circuit 12 is implemented on one die, logic and control circuit 14 is implemented on another die, and the input capacitor 16, inductor 18, and output capacitor 20 are discrete components.

Figure 2A:
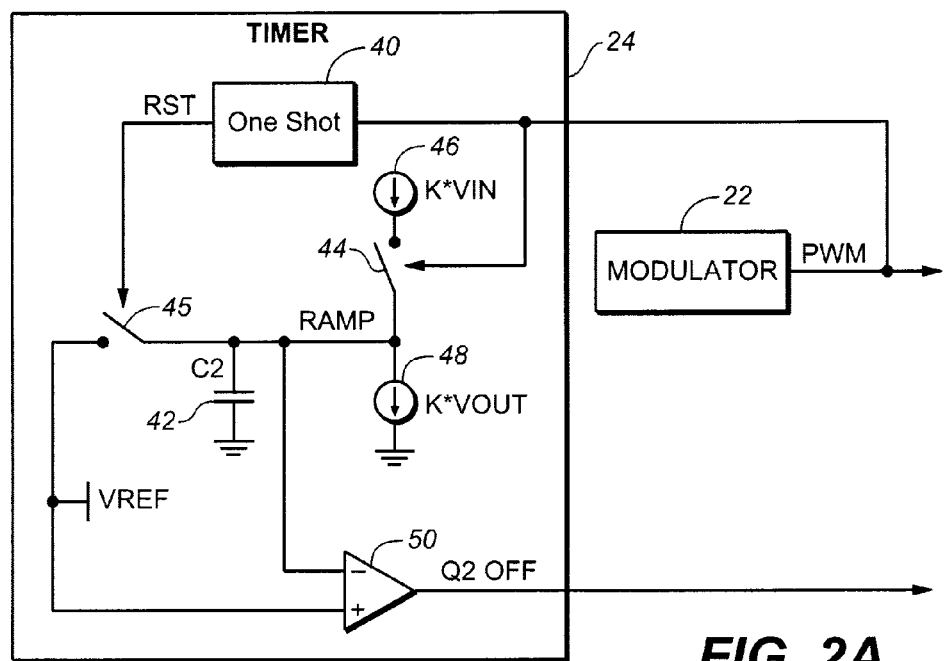
FIG. 2A is a schematic diagram of an exemplary implementation of a timer block, according to an embodiment of the invention.

FIG. 2A is a schematic diagram of an exemplary implementation of a timer block 24, according to an embodiment of the invention. As shown, timer block 24 includes a one shot circuit 40, a capacitor 42, switches 44, 45, current sources 46, 48, and a comparator 50.

As shown, in one implementation, the timing function for turning off the synchronous rectifier (i.e., low-side switch 34) can be accomplished by charging and discharging capacitor 42, which functions as a timing capacitor for timer block 24. When the PWM signal is high, switch 44 is closed, and capacitor 42 is charged with a current proportional to VIN−VOUT. When the PWM signal is low, switch 44 is open, and capacitor 42 discharges with a current proportional to VOUT. Capacitor 42 may be connected at a ramp node to the current sources 46, 48. In this implementation, current source 46 provides a switched charging current (with a magnitude of K*VIN), and current source 48 provides a constant discharging current (with a magnitude of K*VOUT) for discharging capacitor 42. Thus, when switch 44 is closed, capacitor 42 is charged with the difference in current between the two current sources 46 and 48 (or K*VIN−K*VOUT or K*(VIN−VOUT)); and when switch 44 is open, capacitor 42 discharges with current source 48 only (or K*VOUT). Switch 44 is controlled by the modulator block 22, and is closed when PWM signal is high, which produces a waveform on capacitor 42 that has the same timing and magnitude as the inductor current.

For consistent timing, cycle to cycle, of the waveform of capacitor 42, switch 45 resets the voltage on capacitor 42 to VREF at the start of each PWM period. The reset timing for switch 45 is determined by one shot circuit 40, which produces a short duration switch control signal (RST) which momentarily closes switch 45. In addition to resetting the capacitor 42, the width and duration of the RST signal can affect the timing of the turnoff of the synchronous rectifier (low-side switch 34), ensuring, for example that switch 34 will turn off slightly before the inductor current returns to the current that was flowing before switch 34 turned on. This will affect the dead-time of power converter system 10 when the current through inductor 18 is positive at the end of the PWM cycle. For example, in one embodiment, a long duration for the RST signal will result in an increase in the dead-time. A short duration for the RST signal will result in an decrease in the dead-time. Eliminating or reducing the deadtime can be accomplished in a variety of ways, including adding hysteresis to comparator 50, adding an offsetting one-shot pulse after comparator 50 goes high to increase its time by a similar amount of time as the RST pulse, or increasing the "K" multiplier of current source 46 with respect to the "K" multiplier of current source 48.

Comparator 50 compares the voltage at the ramp node (which is the voltage on the capacitor 42) against a reference voltage (VREF). When the voltage at the ramp node is below VREF, the comparator 50 outputs a signal to turn off the synchronous rectifier (low-side switch 34).

Figure 2B:
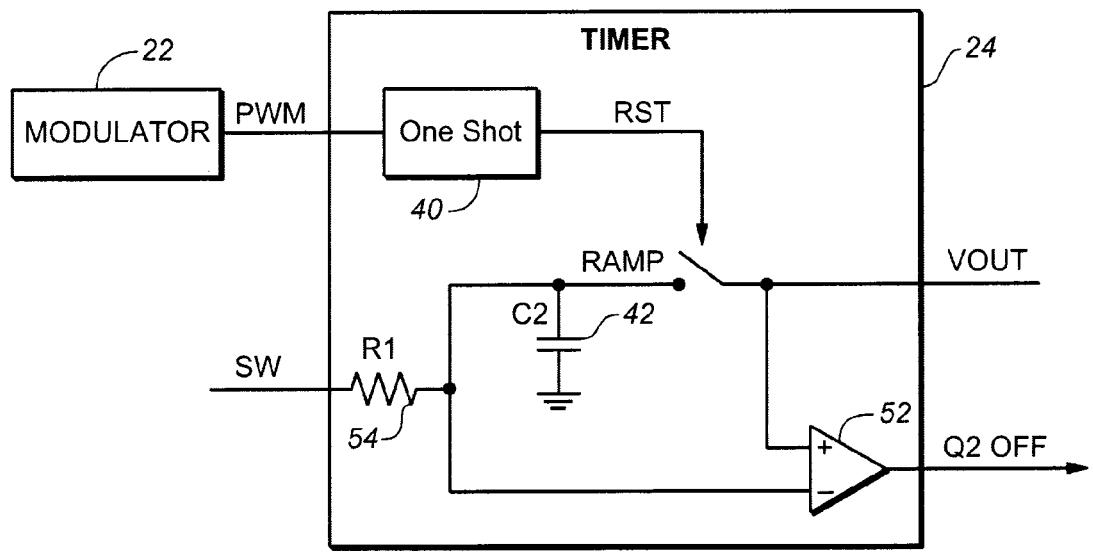
FIG. 2B is a schematic diagram of another exemplary implementation of a timer block, according to an embodiment of the invention.

FIG. 2B is a schematic diagram of another exemplary implementation of a timer block 24, according to an embodiment of the invention. As shown, timer block 24 includes a one shot circuit 40, a capacitor 42, a resistor 54, and a comparator 52. In this embodiment, the timing capacitor 42 of the timer block 24 is charged from the SW node through resistor 54, instead of by reference voltage VREF. The timing capacitor 42 is set to VOUT during reset.

Figure 3:
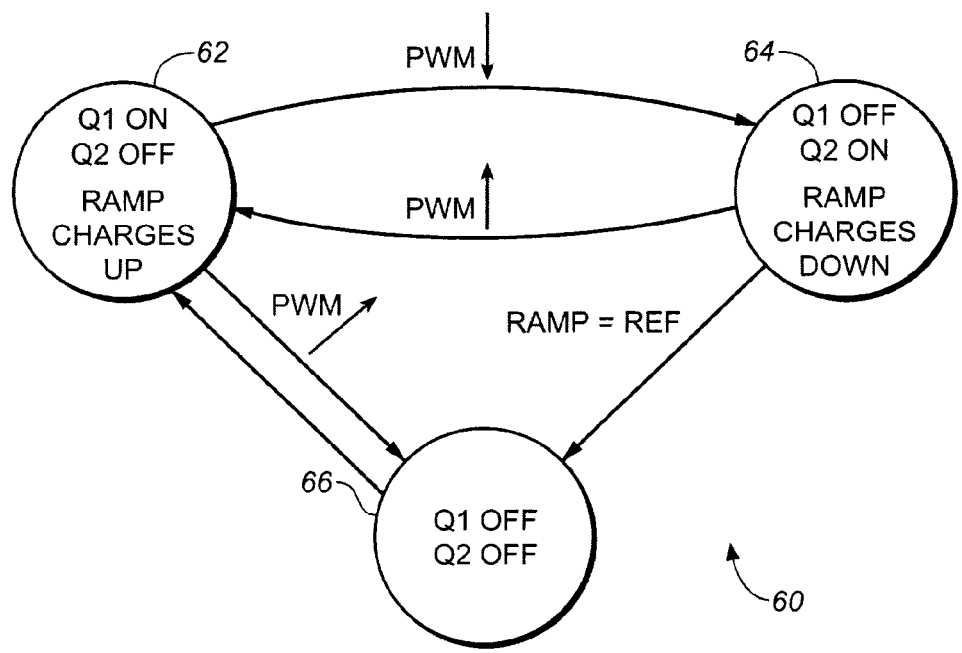
FIG. 3 is an exemplary state diagram for time-based synchronous rectification, according to an embodiment of the invention.

FIG. 3 is an exemplary state diagram 60 for time-based synchronous rectification, according to an embodiment of the invention. In one embodiment, the state diagram 60 can be implemented in power converter system 10. As shown, the state diagram 60 has three states: first state 62, second state 64, and third state 66.

In the first state 62, high-side switch 32 (Q1) is turned on, the current in inductor 18 is increasing, and low-side switch 34 (the synchronous rectifier or Q2) is turned off. In this state, capacitor 42 (connected at the ramp node in timer block 24) is charging up. This can be accomplished with current source 46. Capacitor 42 charges up while the PWM signal is high, which turns on the high-side switch 32. From the first state 62, power converter system 10 can move to second state 64. This occurs when the PWM signal goes low, thus turning off the high-side switch 32 and turning on the low-side switch 34.

In the second state 64, high-side switch 32 (Q1) is turned off, and low-side switch 34 (the synchronous rectifier or Q2) is turned on. In this state, capacitor 42 (connected at the ramp node in timer block 24) is discharging. This can be accomplished with current source 48. From the second state 64, can move either to the first state (when the PWM signal goes high) or to the third state 66 (when the voltage at the ramp node equals the reference voltage (VREF). In other words, power converter system 10 remains in the second state 64 until either the high-side switch 32 is turned on or the timer of timer block 24 expires or times out. Since the capacitor 42 was charged with a slope proportional to the upslope of the inductor current during the first state 62, and discharged with a slope proportional to the downslope of the inductor current during the second state 64, then if the transition out of the second state 64 occurs due to the timer expiring, the current through inductor 18 of power converter system 10 will have returned to its starting value—i.e., the current should have a magnitude approximately equal to what it was at the time that power converter system 10 entered the first state 62.

In the third state 66, both the low-side switch 34 (the synchronous rectifier or Q2) and the high-side switch 32 (Q1) are turned off. From the third state 66, power converter system 10 can move to the first state 62 when the PWM signal goes high, thus turning on the high-side switch 32.

Figure 4A:
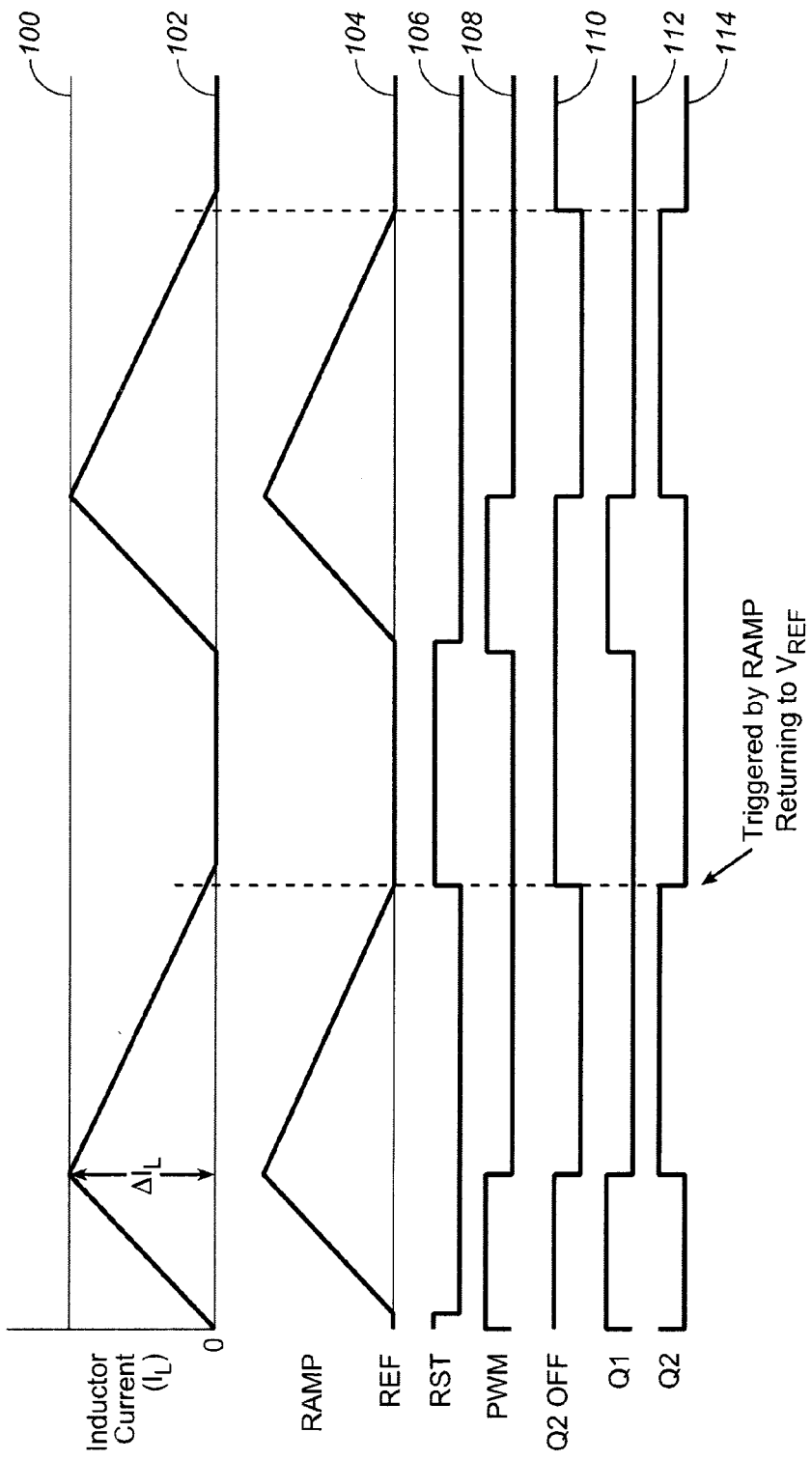
FIGS. 4A and 4B are exemplary waveform diagrams for time-based synchronous rectification, according to an embodiment of the invention.
Figure 4B:
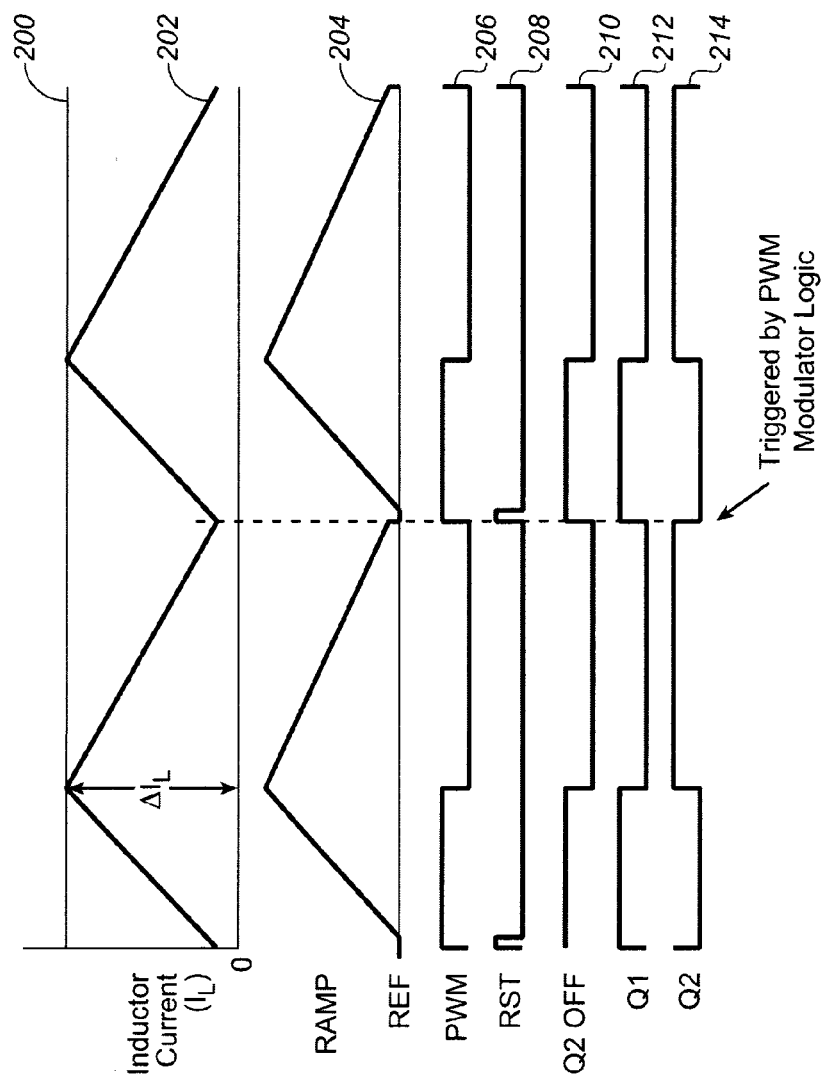

The operation of power converter system 10 with time-based synchronous rectification can be further understood with reference to FIGS. 4A and 4B, which are exemplary waveform diagrams 100 and 200 for the system 10, according to an embodiment of the invention.

Referring to FIG. 4A, waveform diagram 100 has waveforms 102, 104, 106, 108, 110, 112, and 114 which generally represent, respectively, the current flowing in inductor 18, the voltage of capacitor 42 at the RAMP node (compared against reference voltage (VREF)), the RST signal (from one shot circuit 40), the PWM signal output from modulator block 22, the turn-off of the low-side switch 34 (synchronous rectifier Q2), the turn-on of the high-side switch 32 (Q1), and the turn-on of the low-side switch (Q2).

FIG. 4A illustrates the case in which the synchronous rectifier (low-side switch 34 or Q2) is turned off (waveform 110) due to the timer of timer block 24 expiring. Here, the RAMP time-out (which occurs when the voltage of the capacitor has discharged to the magnitude of VREF) causes the synchronous rectifier to turn off and also causes the RST signal to go high, which holds the RAMP voltage at VREF by closing switch 45. The PWM pulse (waveform 108) output from modulator block 22 goes high some time after the RAMP signal returns to VREF (waveform 104). This would be the case when the power converter system 10 is lightly loaded, and the modulator block 22 is required to provide a lower duty cycle (shorter ON times for high-side switch 32).

Referring to FIG. 4B, waveform diagram 200 has waveforms 202, 204, 206, 208, 210, 212, and 214 which generally represent, respectively, the current flowing through inductor 18, the voltage of capacitor 42 at the RAMP node (compared against the reference voltage (VREF)), the PWM signal output from modulator block 22, the RST signal (from one shot circuit 40), the turn-off of the low-side switch 34 (synchronous rectifier or Q2), the turn-on of the high-side switch 32 (Q1), and the turn-on of the low-side switch (Q2).

FIG. 4B illustrates the case in which the synchronous rectifier (low-side switch 34) is turned off (waveform 210) due to the turn on of the high-side switch 32 (waveform 212) and before the expiration of the timer of timer block 24. Here, the PWM pulse (waveform 206) output from modulator block 22 arrives before the RAMP signal returns to VREF (waveform 204). This causes the high-side switch 32 (Q1) to turn on (waveform 212), and the low-side switch 34 (Q2) to turn off (waveforms 210 and 214).

Thus, predictive timing for the control of the synchronous rectifier may allow for almost no extra dead-time during steady-state operation of power converter system 10 and only small increases in dead-time during transients.

As discussed herein, in one embodiment, the present invention turns off the low-side switch or synchronous rectifier in switching voltage converter based on a predictive timing circuit. The timing circuit eliminates the need to sense the inductor current, or the voltage across the low-side switch to determine when to turn off the synchronous rectifier.

In one implementation, this is accomplished by charging a capacitor with a current proportional to the input voltage minus the output voltage (VIN–VOUT) and discharging the same capacitor with a current proportional to VOUT. The low-side switch is turned off when the capacitor voltage during discharge crosses the voltage reference at which that the capacitor started during charge. A short reset (RST) pulse ensures both that the ramp will not start charging for a fixed period of time, and that the capacitor's starting voltage will be a known DC voltage reference (VREF). The RST pulse has the effect of producing a pre-bias which ensures that the synchronous rectifier will turn off during the cycle while a small positive current is flowing in the inductor. Increasing the width of RST pulse can result in a corresponding increase in the amount of current conducted by the body diode when the inductor current is positive at the end of the PWM cycle. The inaccuracy of the turn-off point due to the dead-time can be eliminated by various techniques including changing the relative strength of the charge and discharge currents, or adding positive offset to VREF during the time when the synchronous rectifier is on.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. In a power converter system having first and second switches connected in a half-bridge arrangement at a common node from which current flows through an inductor to a regulated output terminal, wherein the regulated output terminal is connectable to an output capacitor and a load, wherein the first and second switches are turned on and off in cycles, circuitry comprising:
    means for initiating a cycle in which the first switch is turned on;
    means for developing a timer based on the on-time of the first switch during the cycle;
    means for turning off the first switch and turning on the second switch during the cycle; and
    means for outputting a control signal to turn off the second switch when either the timer expires or a new cycle is initiated to turn on the first switch, thereby providing synchronous rectification in the power converter system;
    wherein the means for developing a timer comprises a timing capacitor which charges for the on-time of the first switch during the cycle and discharges to provide the timer;
    wherein the timing capacitor is charged from the common node.

2. The circuitry of claim 1 wherein the means for developing a timer comprises:
    a first current source for charging the timing capacitor; and
    a second current source for discharging the timing capacitor.

3. The circuitry of claim 1 wherein the timing capacitor is charged with a current which is a function of the input voltage of the power converter system and discharged with a current which is a function of the output voltage of the power converter.

4. The circuitry of claim 1 wherein the control signal for turning off the second switch is developed without sensing the current flowing through the inductor.

5. The circuitry of claim 1 wherein the control signal for turning off the second switch is developed without sensing a reversal of current flow through the inductor.

6. The circuitry of claim 1 wherein the control signal for turning off the second switch is developed without sensing the voltage across the second switch.

7. A power converter system comprising:
    first and second switches connected in a half-bridge arrangement at a common node, wherein the first and second switches are turned on and off in cycles;
    an inductor connected between the common node and a regulated output terminal, wherein the regulated output terminal is connectable to a load; and
    a predictive timing circuit operable to start a timing clock signal when the first switch is turned off after one cycle, the predictive timing circuit operable to output a control signal to turn off the second switch when either another cycle begins or when the timing clock signal times out;

wherein the predictive timing circuit comprises a timing capacitor which charges for the on-time of the first switch during the one cycle and discharges to provide the timing clock signal;

wherein the timing capacitor is charged with a current which is a function of the input voltage of the power converter system and discharged with a current which is a function of the output voltage of the power converter;

wherein the timing capacitor is charged from the common node.

8. The power converter system of claim 7 wherein the predictive timing circuit comprises:

a first current source for charging the timing capacitor; and a second current source for discharging the timing capacitor.

9. The power converter system of claim 7 wherein the timing capacitor is charged with a current which is a function of the input voltage of the power converter system and discharged with a current which is a function of the output voltage of the power converter.

10. The power converter system of claim 7 wherein the timing clock signal is set so that the magnitude of current flowing through the inductor when the second switch is turned off is equal to the magnitude of current flowing through the inductor when the first switch is turned on.

11. The power converter system of claim 7 wherein the first switch is a high-side switch and the second switch is a low-side switch.

12. The power converter system of claim 7 wherein the second switch implements a synchronous rectifier.

13. The power converter system of claim 7 wherein the control signal for turning off the second switch is developed without sensing the current flowing through the inductor.

14. The power converter system of claim 7 wherein the control signal for turning off the second switch is developed without sensing a reversal of current flow through the inductor.

15. The power converter system of claim 7 wherein the control signal for turning off the second switch is developed without sensing the voltage across the second switch.

16. A method for synchronous rectification in a power converter system having first and second switches connected in a half-bridge arrangement at a common node from which current flows through an inductor to a regulated output terminal, wherein the regulated output terminal is connectable to a load, wherein the first and second switches are turned on and off in cycles, the method comprising:

initiating a cycle in which the first switch is turned on;

developing a timer based on the on-time of the first switch during the cycle;

turning off the first switch and turning on the second switch during the cycle; and outputting a control signal to turn off the second switch when either the timer expires or a new cycle is initiated to turn on the first switch, thereby providing synchronous rectification in the power converter system;

wherein developing a timer comprises charging a timing capacitor from the common node for the on-time of the first switch during the cycle.

17. The method of claim 16 comprising determining when the first switch is turned on.

18. The method of claim 16 wherein the timer is set so that the magnitude of current flowing through the inductor when the second switch is turned off is close to zero.

19. The method of claim 16 wherein the second switch implements a synchronous rectifier.

20. The method of claim 16 wherein the control signal for turning off the second switch is developed without sensing the current flowing through the inductor.

21. The method of claim 16 wherein the control signal for turning off the second switch is developed without sensing a reversal of current flow through the inductor.

22. The method of claim 16 wherein the control signal for turning off the second switch is developed without sensing the voltage across the second switch.

23. An integrated circuit device for use in a power converter system having first and second switches connected in a half-bridge arrangement at a common node from which current flows through an inductor to a regulated output terminal, wherein the regulated output terminal is connectable to an output capacitor and a load, wherein the first and second switches are turned on and off in cycles, the integrated circuit device comprising:

circuitry to initiate a cycle in which the first switch is turned on;

circuitry to develop a timer based on the on-time of the first switch during the cycle;

circuitry to turn off the first switch and turn on the second switch during the cycle; and circuitry to output a control signal to turn off the second switch when either the timer expires or a new cycle is initiated to turn on the first switch, thereby providing synchronous rectification in the power converter system;

wherein the circuitry to develop a timer comprises a timing capacitor which charges for the on-time of the first switch during the cycle and discharges to provide the timer;

wherein the timing capacitor is charged from the common node.

24. The integrated circuit device of claim 23 comprising:

a first current source for charging the timing capacitor; and a second current source for discharging the timing capacitor.

25. The integrated circuit device of claim 23 wherein the timing capacitor is charged with a current which is a function of the input voltage of the power converter system and discharged with a current which is a function of the output voltage of the power converter.

26. The integrated circuit device of claim 23 wherein the timer is set so that the magnitude of current flowing through the inductor when the second switch is turned off is equal to the magnitude of current flowing through the inductor when the first switch is turned on.

27. The integrated circuit device of claim 23 wherein the first switch is a high-side switch and the second switch is a low-side switch.

28. The integrated circuit device of claim 23 wherein the second switch implements a synchronous rectifier.

29. The integrated circuit device of claim 23 wherein the control signal for turning off the second switch is developed without sensing the current flowing through the inductor.

30. The integrated circuit device of claim 23 wherein the control signal for turning off the second switch is developed without sensing a reversal of current flow through the inductor.

31. The integrated circuit device of claim 23 wherein the control signal for turning off the second switch is developed without sensing the voltage across the second switch.

* * * * *